(12) United States Patent
Hitz

(10) Patent No.: US 11,362,930 B2
(45) Date of Patent: Jun. 14, 2022

(54) SYSTEM AND METHOD FOR CARRYING AND OPTIMIZING INTERNET TRAFFIC OVER A SOURCE-SELECTED PATH ROUTING NETWORK

(71) Applicant: Anapaya Systems AG, Zurich (CH)

(72) Inventor: Samuel Hitz, Zurich (CH)

(73) Assignee: Anapaya Systems AG, Zurich (CH)

( * ) Notice: Subject to any disclaimer, the term of this patent is extended or adjusted under 35 U.S.C. 154(b) by 23 days.

(21) Appl. No.: 17/007,901

(22) Filed: Aug. 31, 2020

(65) Prior Publication Data
US 2022/0021599 A1    Jan. 20, 2022

(30) Foreign Application Priority Data

Jul. 16, 2020 (EP) ..................................... 20186294

(51) Int. Cl.
*H04L 12/751* (2013.01)
*H04L 45/02* (2022.01)
(Continued)

(52) U.S. Cl.
CPC .............. *H04L 45/02* (2013.01); *H04L 12/66* (2013.01); *H04L 45/04* (2013.01); *H04L 45/122* (2013.01); *H04L 45/74* (2013.01); *H04L 2212/00* (2013.01)

(58) Field of Classification Search
CPC ......... H04L 45/02; H04L 12/66; H04L 45/04; H04L 45/122; H04L 45/74; H04L 2212/00; H04L 45/46; H04L 45/741
See application file for complete search history.

(56) References Cited

U.S. PATENT DOCUMENTS 6,633,544 B1   10/2003  Rexford et al.
7,151,775 B1   12/2006  Renwick et al.
(Continued)

FOREIGN PATENT DOCUMENTS

WO    WO 2019/162210 A1    8/2019
WO    WO-2019162210 A1 *  8/2019   ............. H04L 45/04

OTHER PUBLICATIONS

Piergiacomo De Marchi et al: "Gateway Architectures for Interaction between the Current Internet and Future Internet Architectures Relatore", Dec. 4, 2017 (Dec. 4, 2017), XP055757829, retrieved from the internet: URL: http://tesi.cab.unipd.it/57086/1/UNIPDThesis.pdf [retrieved Dec. 8, 2020].

(Continued)

*Primary Examiner* — Wutchung Chu
(74) *Attorney, Agent, or Firm* — Davis Wright Tremaine LLP; Greg Rosenthal

(57) ABSTRACT

The present application generally relates to a system and method for interfacing a source-selected path routing network with existing legacy IP networks. This interfacing may be achieved by installing specific router devices at the borders of the source-selected path routing network. Said router devices are able to exchange routing information in the form of IP prefix announcements and withdrawals between legacy IP networks and the source-selected path routing network according to an appropriate exterior gateway protocol. Hereby, the source-selected path routing network that in reality comprises a plurality of autonomous systems is conceptually regarded as a single autonomous system. Hence, a legacy IP network that is a direct neighbor of a source-selected path routing network may ensure that traffic destined to it traverses the source-selected path routing network by announcing its routing information only to (Continued)

the source-selected path routing network via an appropriate exterior gateway protocol.

20 Claims, 3 Drawing Sheets

(51) Int. Cl.
    *H04L 12/66*     (2006.01)
    *H04L 45/122*     (2022.01)
    *H04L 45/74*     (2022.01)

(56) References Cited

U.S. PATENT DOCUMENTS

| | | | |
|---|---|---|---|
| 7,675,912 B1 * | 3/2010 | Ward | H04L 45/04 |
| | | | 370/392 |
| 7,751,331 B1 | 7/2010 | Blair et al. | |
| 7,752,332 B2 | 7/2010 | Jiang et al. | |
| 8,897,141 B2 | 11/2014 | Liu et al. | |
| 9,660,897 B1 | 5/2017 | Gredler | |
| 10,594,592 B1 * | 3/2020 | Wang | H04L 45/02 |
| 2002/0141429 A1 * | 10/2002 | Pegrum | H04L 45/00 |
| | | | 370/428 |
| 2004/0039840 A1 * | 2/2004 | Dispensa | H04L 45/586 |
| | | | 709/242 |
| 2009/0245243 A1 | 10/2009 | Rangarajan et al. | |
| 2010/0309795 A1 | 12/2010 | Shah et al. | |
| 2012/0177054 A1 * | 7/2012 | Pati | H04L 12/4625 |
| | | | 370/395.53 |
| 2013/0188493 A1 | 7/2013 | Numata | |
| 2014/0129735 A1 | 5/2014 | Thyni et al. | |
| 2015/0003458 A1 * | 1/2015 | Li | H04L 45/507 |
| | | | 370/392 |
| 2015/0304206 A1 | 10/2015 | Filsfils | |
| 2015/0350062 A1 * | 12/2015 | Lindem, III | H04L 45/22 |
| | | | 370/220 |
| 2016/0065449 A1 | 3/2016 | Pani et al. | |
| 2016/0119229 A1 * | 4/2016 | Zhou | H04L 12/4633 |
| | | | 370/392 |
| 2017/0026275 A1 * | 1/2017 | Yang | H04L 61/25 |
| 2017/0026288 A1 * | 1/2017 | Yang | H04L 45/745 |
| 2017/0230198 A1 * | 8/2017 | Xu | H04L 45/04 |
| 2017/0310589 A1 * | 10/2017 | Tambakuwala | H04L 45/04 |
| 2018/0309635 A1 * | 10/2018 | Lopes | H04L 45/02 |
| 2020/0252333 A1 * | 8/2020 | Mishra | H04L 45/741 |
| 2020/0304399 A1 * | 9/2020 | Hitz | H04L 45/126 |
| 2020/0403902 A1 * | 12/2020 | Saad | H04L 47/724 |
| 2021/0250275 A1 * | 8/2021 | Chen | H04L 45/04 |
| 2021/0273876 A1 * | 9/2021 | Chen | H04L 45/04 |
| 2021/0297351 A1 * | 9/2021 | Vegesna | H04L 49/90 |

OTHER PUBLICATIONS

European Patent Office, Extended European Search Report, dated Dec. 17, 2020 (not published until EP application published), 13 pages, European Patent Office, 80298 Munich, Germany.

Adrian Perring et. al., SCION: A Secure Internet Architecture, Aug. 30, 2017, Zurich, Switzerland available at https://www.scion-architecture.net/pdf/SCION-book.pdf.

* cited by examiner

SYSTEM AND METHOD FOR CARRYING AND OPTIMIZING INTERNET TRAFFIC OVER A SOURCE-SELECTED PATH ROUTING NETWORK

CROSS-REFERENCE TO RELATED APPLICATION(S)

The present application claims priority to European Patent Application EP20186294, which was filed on Jul. 16, 2020 and titled "SYSTEM AND METHOD FOR CARRYING AND OPTIMIZING INTERNET TRAFFIC OVER A SOURCE-SELECTED PATH ROUTING NETWORK," the disclosure of which is incorporated herein by reference in its entirety.

TECHNICAL FIELD

The present application relates to a system and a method for routing and forwarding data packets to a legacy IP network through a source-selected path routing network as well as to a router for use in such a system and method that establishes interoperability between legacy IP networks and a source-selected path routing network.

BACKGROUND

Most Internet traffic today consists of Internet Protocol (IP) packets. To send IP traffic, a host first determines an IP address of a given destination, often using a service such as Domain Name Service (DNS). The host then includes the IP address in an IP header section of a data packet and sends the packet to a nearby router. At this point, the host no longer has any control over the path the data packet will take to reach its destination, i.e., the data packet travels through a sequence of routers, each of said routers deciding where to send the packet based on the destination IP address and its local routing table (and possibly other packet contents). For routers located in the core of the Internet, this routing table is often built from information exchanged through the Border Gateway Protocol (BGP). Such principle of data packet transport is sometimes referred to as hop-by-hop transport or next-hop transport. Communication networks employing such transport principles are referred to as packet switched networks or simply as standard legacy IP networks (or legacy IP network).

Packet forwarding according to the next-hop transport scheme in a packet switched network such as the current Internet suffers from many security and reliability issues however, as shown by recent incidents involving BGP disclosing most of the information needed for forwarding.

Recent patches to improve Internet security and availability have been constrained by the design of the current Internet architecture. Hence, there is a need for a new Internet architecture that offers availability and security by design.

SCION, as described in the book "SCION: A Secure Internet Architecture", by A. Perrig et al., which is hereby included by reference in its entirety, available at https://www.scion-architecture.net/pdf/SCION-book.pdf (and referred to as the SCION book in what follows; also available as eBook, ISBN 978-3-319-67080-5; and in printed form, ISBN 978-3-319-67079-9), is a next generation Internet architecture with a focus on improving both the security and the reliability of networks by performing the routing of data packets in a different way. As opposed to IP networks where only the destination address is needed for forwarding, SCION implements a model called source-selected path routing. In this model, each packet includes the full path, namely a sequence of router interfaces and Autonomous Systems (ASes) constituting the basic element of SCION it must traverse to reach its destination. To send a new data packet, a host queries SCION infrastructure services and receives one or more paths. In response, the host chooses the path it prefers and embeds it in a section of the data packet called the path. Any router along said path from the host to a destination address follows the instructions contained in this path when forwarding the data packet without the need for any lookups in inter-domain forwarding tables. The routers along said path thus do not make any routing decision other than whether or not to forward the data packet.

SCION is fundamentally different from other architectures, which generally require knowledge about the entire network topology in order to be able to route a data packet along a specific path. In SCION, possible routing paths along which data packets may be sent are initially explored by utilizing path-segment construction beacons (PCBs). During said process, referred to as beaconing, PCBs accumulate cryptographically protected path information between autonomous systems (ASes) as they traverse the SCION network. The collected information is then chained together to create a data transmission path segment that traverses a sequence of ASes. The path resolution process of SCION creates an end-to-end forwarding path to a destination and consists of a path lookup, where the path segments are obtained, and a path combination, where an actual forwarding path is created from the path segments.

Such a path-based Internet architecture offers numerous benefits. Depending on application needs, an optimal path can be selected by optimizing latency, available bandwidth, or packet loss characteristics. If needed, multiple paths can be used simultaneously by the same host, to take advantage of a plurality of network resources. Path-based forwarding also provides path transparency to the host, enabling routing around undesired parts of the network or conversely routing through a required network. Further, network faults can be rapidly circumvented by selecting a different path. Numerous additional benefits exist, but the core point is that the SCION architecture enhances security, communication performance, and network capacity.

It would now be desirable that a migration to said new Internet architecture require minimal added complexity to the existing legacy Internet infrastructure. Ideally, existing Internet traffic may already benefit from the new Internet architecture as provided by SCION without requiring full deployment in the core of the Internet nor changes to applications or to end hosts.

SUMMARY

In the following, a summary is provided to introduce a selection of representative concepts in a simplified form that are further described below in the detailed description. This summary is not intended to identify key features or essential features of the claimed subject matter, nor is it intended to be used in any way that would limit the scope of the appended claims.

The present application provides a method for carrying legacy IP Internet traffic over a source-selected path routing network, such as the SCION network, in a fully transparent way. Hence, applications, hosts, or legacy IP networks on the path from the source host to the destination host may not even be aware of the SCION network. Regarding SCION, the SCION book is hereby incorporated by reference in its entirety, available at https://www.scion-architecture.net/pdf/SCION-book.pdf. Specifically, when referring to a SCION network, this present application incorporates SCION as described in the book "SCION: A Secure Internet Architecture", by A. Perrig et al., which is hereby incorporated herein by reference for its entirety, available at https://www.scion-architecture.net/pdf/SCION-book.pdf (and referred to as the SCION book in what follows; also available as eBook, ISBN 978-3-319-67080-5; and in printed form, ISBN 978-3-319-67079-9). Definitions from the SCION book are also incorporated herein by reference where the definitions do not contradict this present application. For example, an Autonomous System (AS) is a locally connected network under a common administrative control (e.g., a network at a university is an AS). If an organizational entity operates multiple networks that are not directly connected through a local area network, then the different networks are considered different ASes in SCION. See, e.g., page 437 of SCION book.

As indicated, the present application cannot only be applied to the specific context of a SCION network but is applicable to any kind of source-selected path routing network that works in a similar way as SCION. Therefore, use of the specific term SCION network in the following should be understood to also mean that other kinds of source-selected path routing network may be used instead of a SCION network.

Accordingly, the method according to the present application interfaces a source-selected path routing network, such as the SCION network, with existing legacy IP networks. Legacy IP networks are generally networks not using SCION, e.g., using a standard IP protocol to operate a network. This interfacing may be achieved by installing routing devices at the borders of the SCION network.

Those routing devices are on the one hand able to transport data packets received from neighboring legacy IP networks through the SCION network by encapsulating said data packets into a stream of SCION packets, sending them through the SCION network and then decapsulating said stream of data packets before said data packets leave the SCION network.

On the other hand, said routing devices provide a mechanism to exchange routing information in the form of IP prefix announcements and withdrawals between legacy IP networks through a SCION network. Said routing devices may exchange routing information between the SCION network and other legacy IP networks according to an appropriate exterior gateway protocol (EGP) by establishing exterior border gateway protocol peering sessions with respective routers of neighboring legacy IP networks.

An example of an appropriate EGP is BGP version 4. Appropriate generally means suitable, e.g., BGP. However, any other previous and later or similar BGP versions as well as any other alternatives to BGP are regarded as appropriate EGPs in the context of the present application. Without loss of generality, the specific EGP used in the remainder of this application is the Border Gateway Protocol (BGP) version 4 and the respective routers accordingly are BGP routers.

While the SCION network comprises a plurality of autonomous systems in the SCION protocol, the entirety of the SCION network is conceptually regarded as a single autonomous system (AS) in BGP. Said single autonomous system, as the plurality of ASes appear to be to a neighboring legacy IP network in BGP, is also referred to as a SCION backbone AS in the context of the present application.

Hence, the present application enables a legacy IP network that is a direct neighbor of a source-selected path routing network, such as the SCION network, to ensure that traffic to and from said legacy IP network will traverse the SCION network by announcing its routing information only to the SCION backbone AS. The announcing can be performed by a router configured to operate a SCION network. Alternatively, a legacy IP network may also only selectively announce via BGP certain routing information such as IP prefixes to the SCION backbone AS and other routing information to other neighboring legacy IP networks. In this way, a legacy IP network can guarantee that incoming traffic passes through the SCION network for the IP prefixes announced to the SCION backbone AS.

More in detail, in a method according to the present application, a node in a first legacy IP network being a direct neighbor of a SCION network may announce its routing information to a routing device in the SCION network using an appropriate exterior gateway protocol. The routing device in the SCION network subsequently announces said routing information announced by the node in the first legacy IP network to a second routing device within the SCION network by using an interior I gateway protocol (IGP) in SCION. The second routing device subsequently announces said received routing information regarding the first legacy IP network to a second legacy IP network that is also a direct neighbor of the SCION network. When performing said announcement, no routing information necessary for routing data packets within the SCION network from the first routing device comprised in a first SCION AS to the second routing device being comprised in a second AS through the plurality of SCION ASes is announced, since the SCION network appears as a single backbone AS to neighboring legacy IP networks with which the SCION network communicates via the BGP.

Once the routing information to a node in a first legacy IP network has been successfully announced, data packets originating for example from the second legacy IP network are forwarded to the first legacy IP network through the SCION network.

Moreover, the present application is also directed to a router device for use inside an autonomous system (AS) of a source-selected path routing network, which is capable of interfacing the source-selected path routing network comprising a plurality of autonomous systems (ASes) with neighboring legacy IP networks. Said router device is configured to exchange routing information in the form of a specific range of IP prefix announcements of legacy IP networks with a neighboring legacy IP network using the BGP. The exchanged routing information merely refers to the routing according to the BGP. Therefore, when exchanging said routing information, no routing information necessary for routing data packets within the source-selected path routing network are exchanged with the neighboring legacy IP network. Further, the router device is also adapted to exchange said routing information with a second router device that is located in a second AS of the source-selected path routing network using an interior gateway protocol (IGP) such as a source-selected path routing network protocol. Moreover, the router device is responsible for transporting data packets received from the neighboring legacy IP network through the source-selected path routing network. For this purpose, the router device is configured to encapsulate said data packets into suitable data packets for forwarding within the source-selected path routing network. On the other hand, the router device is also responsible for forwarding data packets received from the second router device located in the second AS of the source-selected path routing network to the neighboring legacy IP network. When performing said action, the router device first of all has to decapsulate said data packets before they may leave the source-selected path routing network and then forwards said data packets to the neighboring legacy IP network by means of next-hop routing.

The present application is also directed to a system for routing and forwarding data packets that comprises a first legacy IP network B comprising a node B1, a second legacy IP network A comprising a node A1 and a source-selected path routing network that is a direct neighbor of both the first legacy IP network B and the second legacy IP network A. The source-selected path routing network comprises a plurality of autonomous systems, ASes, out of which at least two comprise a routing device as described above. Although the source-selected path routing network comprises a plurality of ASes, it merely appears as a single backbone AS when communicating with node B1 in the legacy IP network B and with node A1 in the legacy IP network A using an appropriate exterior gateway protocol such as the BGP. In some embodiments, the present application discloses a technical solution to a technical problem of enabling secure communication over the internet or intranets.

In some implementations (e.g., embodiment above), a direct neighbor generally is a network that, from the perspective of the exterior gateway protocol, has established a exterior gateway protocol (EGP) session with network B. Usually, this means that routers are directly connected either physically (layer 1) or on layer 2 (and BGP/IP/SCION are on layer 3 of the networking stack). Also, in some implementations, a neighbor network is a network that has established an EGP session with the local network.

BRIEF DESCRIPTION OF THE DRAWINGS

The subject matter of the present application will be explained in more detail in the following text with reference to exemplary embodiments, which are illustrated in the attached drawings, of which.

DETAILED DESCRIPTION

Figure 1:
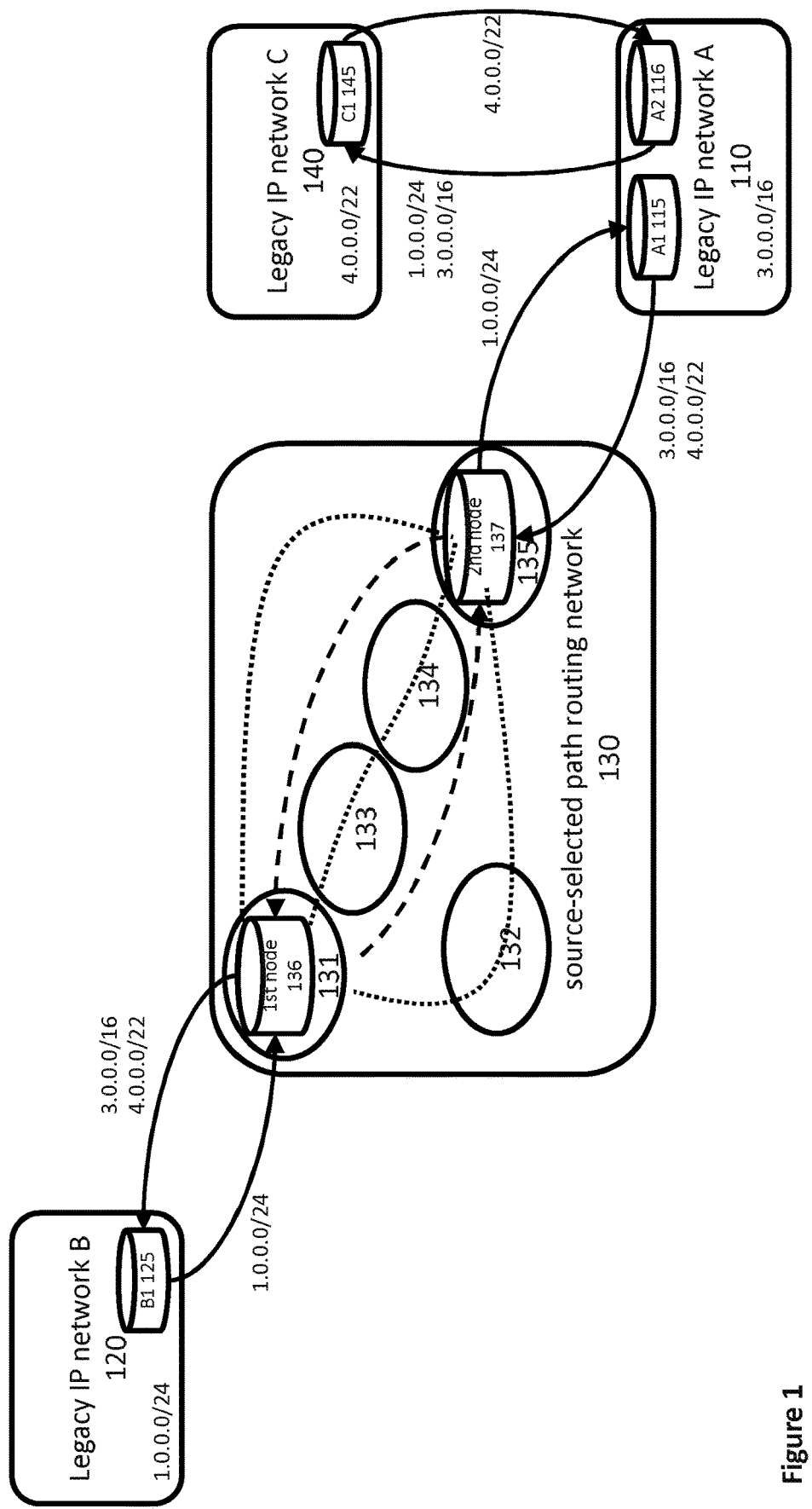
FIG. 1 is an embodiment of the present application, schematically illustrating a part of the Internet comprising a plurality of different networks.

FIG. 1 schematically shows a part of the Internet 100 comprising three legacy IP networks A 110, B 120, and C 140 as well as a source-selected path routing network 130. Legacy IP network A 110 includes at least one node A1 115 that is capable of communicating with nodes in neighboring networks using an appropriate exterior gateway protocol (EGP) such as for example the border gateway protocol (BGP). Likewise, legacy IP network B 120 includes at least one node B1 125 that is able to communicate with nodes in neighboring networks by means of the BGP, and legacy IP network C 140 includes at least one node C1 145 that is able to communicate with nodes in neighboring networks using the BGP. Source-selected path routing network 130 comprises a plurality of autonomous systems (ASes), such as autonomous systems 131, 132, 133, 134, and 135 illustrated in FIG. 1. Moreover, AS 131 and AS 135 are shown as including a first node 136 and a second node 137.

It is important to point out that the first node 136 and the second node 137 of the source-selected path routing network 130 are at the same time able to communicate via the BGP with nodes in neighboring legacy IP networks and to communicate with each other and with other nodes within the source-selected path routing network 130 by using an internal source-selected path routing network protocol. In the example of FIG. 1, first node 136 is able to communicate with node B1 125 in neighboring legacy IP network B 120 using the BGP and with a node (not shown) inside AS 132 using an internal I source-selected path routing network protocol. Similarly, second node 137 is capable to communicate with node A1 115 in neighboring legacy IP network A 110 using the BGP and to communicate with a node (not shown) inside AS 134 via an internal source-selected path routing network protocol.

Based on FIG. 1, it is illustrated how a receiver IP host such as node B1 125 in legacy IP network B 120 may make sure that data packets destined to it are routed and forwarded through a source-selected path routing network, such as the source-selected path routing network 130 shown in FIG. 1.

In a first step, node B1 125 of legacy IP network B 120 announces its routing information to the first node 136 within the source-selected path routing network 130 being a direct neighbor of legacy IP network B 120 using the BGP.

Hereby, the routing information typically comprises an IP prefix or a specific range of IP prefixes of receiver IP network B 120 or a complete IP address of a node such as host node B1 125 in legacy IP network B 120 that is exclusively announced to the first node 136 within the source-selected path routing network 130. If receiver host node B1 125 in legacy IP network 120 is for example reachable among the IP prefix 1.0.0.0/24, B1 125 announces this information to the first node 136 via the BGP. By announcing said routing information (e.g., prefixes associated with routing) from node B1 125 in the legacy IP network B 120 to the first node 136 in the source-selected path routing network 130, it is made sure that data traffic destined for the node B1 125 enters the source-selected path routing network 130 as soon as possible so that the part of the network path being within the source-selected path routing network 130 is maximized when forwarding data packets.

At the same time, when establishing a communication with first node 136, node B1 125 vice-versa receives the announcement of the IP prefixes of legacy IP network A 110 (3.0.0.0/16) and optionally also of legacy IP network C 140 (4.0.0.0/22). Hence, node B1 125 learns that it may reach both legacy IP network A 110 and legacy IP network C 140 via the first node 136 in the source-selected path routing network 130.

It should be understood that the announcement of IP prefixes of legacy IP networks that may be reached via the source-selected path routing network 130 is not merely limited to the two IP prefixes of legacy IP network A 110 and legacy IP network C 140 illustrated in FIG. 1. Instead, the first node 136 may announce the IP prefixes of a large number of further legacy IP networks that are not shown in FIG. 1 and that may be reached via the source-selected path routing network 130.

Subsequently, the first node 136 in first AS 131 announces said routing information received from node B1 125 to the second node 137 in second AS 135 within the source-selected path routing network. For said announcement of routing information from first node 136 to second node 137 (via intermediate ASes, such as 133, 134, 132), an internal source-selected path routing network protocol, such as an interior gateway protocol (IGP) is used instead of the BGP. In the specific context of SCION, the so-called SIG IP allocation configuration is used as interior gateway protocol.

Figure 2:
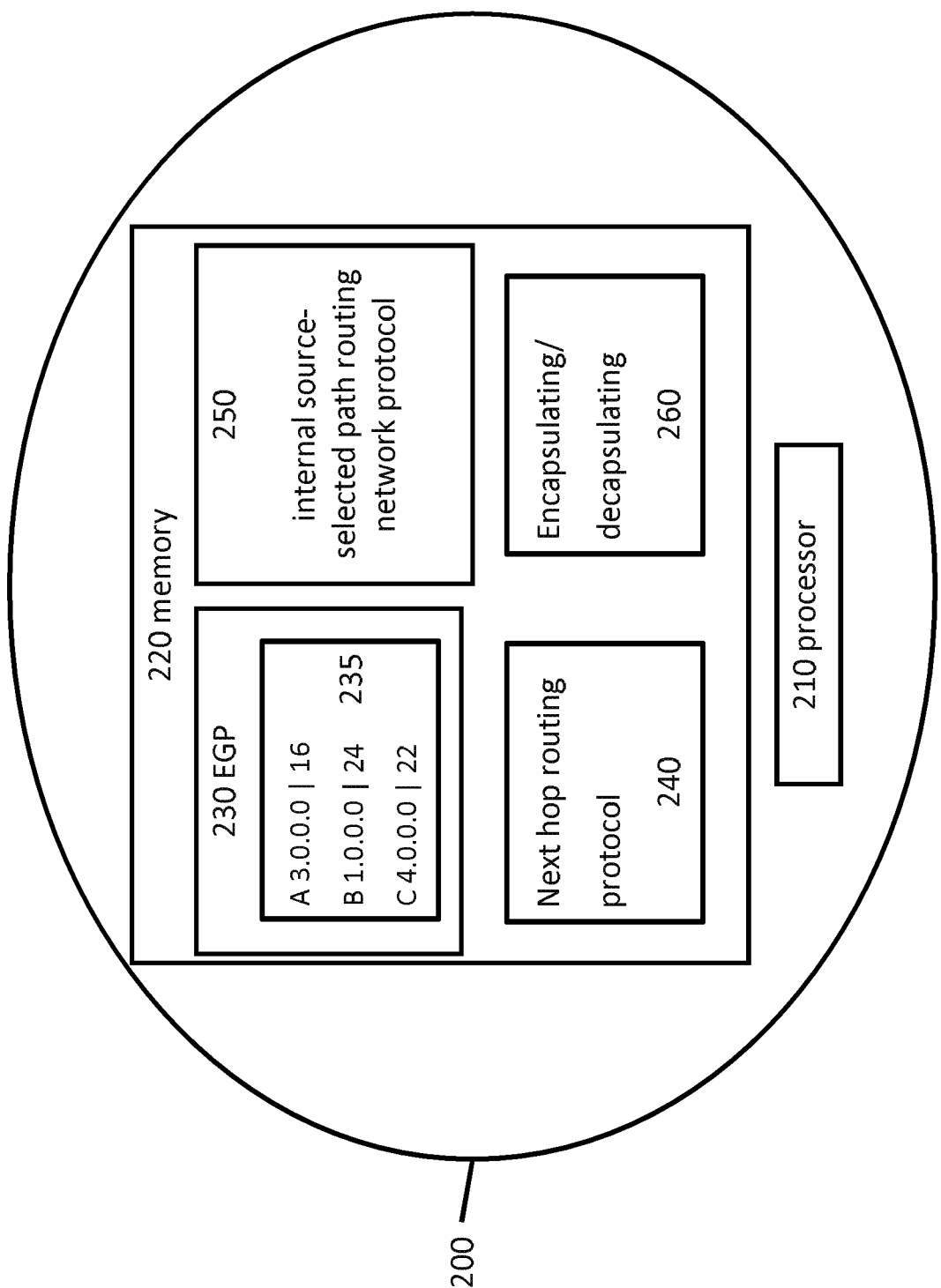
FIG. 2 schematically illustrates an embodiment of a router device according to the present application.

Both first node 136 and second node 137 are examples of a router device 200 of a source-selected path routing network such as source-selected path routing network 130 according to the present application. Said router device 200 is further illustrated in FIG. 2.

Said router device 200 comprises a processor 210 and a memory 220, on which four different modules for performing the different functionalities of announcing IP prefixes and forwarding data packets respectively within the source-selected path routing network 130 and between the source-selected path routing network 130 and neighboring legacy IP networks such as legacy IP networks A 110 and B 120 are stored.

As mentioned before, said router devices 200 are able to establish a communication session with a routing device such as for example the first node B1 125 in neighboring legacy IP network B 120 by using the BGP 230 and thus to exchange routing information. Routing information in the form of IP prefix announcements that is announced by the router device 200 to the first node B1 125 as well as routing information that is vice-versa announced by the first node B1 125 in the neighboring legacy IP network B 120 to the router device 200 is subsequently stored in a routing table 235 on the memory 220. Said routing table 235 is then used for forwarding data packets between legacy IP networks and between a legacy IP network such as legacy IP network B 120 and the source-selected path routing network 130 according to a next-hop routing protocol such as e.g. the Internet protocol (IP). This functionality of router device 200 is illustrated by the next hop routing protocol module 240 stored on memory 220.

Apart from acting as a BGP router 230, the router device 200 also acts as a router that is configured to exchange said routing information with a second router device 200 located in a second AS of the source-selected path routing network 130 using an internal source-selected path routing network protocol such as for example an appropriate interior gateway protocol (IGP) 250.

Router device 200 is accordingly able to transport data packets received from a neighboring legacy IP network such as for example legacy IP network B 120 through the source-selected path routing network 130 to the second router device 200. For said purpose, router device 200 is configured to encapsulate said received data packets into suitable data packets for forwarding within the source-selected path routing network 130. At the same time, router device 200 is capable to decapsulate data packets received from the second router device 200 within the source-selected path routing network 130, before said data packets leave the source-selected path routing network 130 according to the next-hop routing protocol 240. The functionality of the router device 200 of encapsulating and decapsulating data packets for forwarding within the source-selected path routing network 130 is illustrated by module 260 stored on the memory 220 of the router device 200 in FIG. 2.

Returning to FIG. 1, while within the source-selected path routing network 130, the first node 136 belongs to a first AS 131 that is different from a second AS 135 to which the second node 137 belongs. However, both said ASes 131 and 135 appear to constitute a single AS from the view of neighboring legacy IP networks communicating with source-selected path routing network 130. In other words, ASes 131, 132, 133, 134, and 135 of the source-selected path routing network 130 appear to neighboring legacy IP networks as a single AS called herein below a backbone AS.

Said single backbone AS, as which the source-selected path routing network 130 acts under the BGP, is registered in the same way as any other AS communicating under the BGP with one of the Regional Internet registries to obtain a public BGP-AS number that is necessary for establishing BGP peering sessions with other BGP-ASes.

Further, when communicating with the second node 137 via the internal source-selected path routing network protocol, the first node 136 also receives routing information regarding further legacy IP networks that may be reached via the source-selected path routing network 130 from the second node 137. In the example shown in FIG. 1, second node 137 announces the IP prefixes of legacy IP network A 110 (3.0.0.0/16) and optionally also that of legacy IP network C 140 (4.0.0.0/22).

The routing information comprising the IP prefix 1.0.0.0/24 of the receiver legacy IP network B 120 is then further announced by the second node 137 to the node A1 115 of the legacy IP network A 110, which is a direct neighbor of the second node 137. Said announcement is again made by using an appropriate BGP such as e.g. BGP version 4. Accordingly, none of the routing information necessary for routing data packets within the source-selected path routing network 130 between the first node 136 and the second node 137 is additionally announced to node A1 115. Instead, the source-selected path routing network 130 acts as a single backbone AS when communicating with node A1 115 in the neighboring legacy IP network A 110 using the BGP. Therefore, node A1 115 learns that it may reach receiver network B 120 via second node 137 in the source-selected path routing network 130 acting as a backbone AS.

In addition, when the BGP communication session between the second node 137 and node A1 115 of the legacy IP network A 110 is established, node A1 115 also announces routing information regarding the IP prefixes of legacy IP network A 110 (3.0.0.0/16) and optionally also that of legacy IP network C 140 (4.0.0.0/22) to the second node 137 in the source-selected path routing network 130.

Hereby, node A1 115 learns about the IP prefixes (4.0.0.0/22) of legacy IP network C 140 by means of an active BGP session between itself or alternatively a different node A2 116 of legacy IP network A 110 with a node C1 145 in legacy IP network C. In said BGP session, node C1 145 announces the IP prefix (4.0.0.0/22) of legacy IP network C 140 to either node A1 115 or node A2 116. Vice versa, either node A1 115 or node A2 116 announce the IP prefixes of legacy IP network A 110 (3.0.0.0/16) and of legacy IP network B 120 (1.0.0.0/24) to the node C1 145 in the legacy IP network C 140. Hence, node C1 145 in legacy IP network C 140, which is a neighboring IP network of legacy IP network A 110, learns that in order to reach legacy IP network B 120 the next legacy IP network to which to forward data packets is legacy IP network A 110. Therefore, by means of the described announcing, legacy IP network B 120 can make sure that data packets originating from a node C1 145 in the legacy IP network C 140 destined for a node B1 125 comprised in the legacy IP network B 120 are forwarded via the source-selected path routing network 130.

If the active BGP session between legacy IP network A 110 and legacy IP network C 140 is established by node A2 116 in legacy IP network A 110 and not directly by node A1 115, the routing information is forwarded within legacy IP network A 110 by means of an interior gateway protocol (IGP).

Returning to the example mentioned above, since the IP prefix (1.0.0.0/24) of legacy IP network B 120 has been announced to legacy IP network A 110, which thus has learned how to reach legacy IP network B 120, data packets destined for an IP host such as node B1 125 in legacy IP network B 120 may now be forwarded in such a way that it is made sure that said data packets traverse the source-selected path routing network 130.

When node A1 115 in legacy IP network A 110 acts as a sender of data packets destined for node B1 125 in legacy IP network B 120, said data packets are first of all forwarded to the second node 137 in the source-selected path routing network 130 acting as a single backbone AS using a next-hop routing protocol such as the Internet Protocol (IP). Said forwarding of data packets from node A1 115 to the second node 137 is thus performed by next-hop routing.

From the second node 137, the data packets are forwarded to the first node 136 along a selected path via a plurality of the autonomous systems 131, 132, 133, 134, 135 of the source-selected path routing network 130.

Said selection of a specific path for forwarding the data packets from the second node 137 to the first node 136 is performed among at least a subset of the plurality of available paths at the second node 137 based on the network properties of said subset of available paths. Network properties that are taken into account when selecting an appropriate path from at least a subset of available paths through the source-selected path routing network 130 comprise latency, bandwidth, throughput, jitter, packet loss and/or maximum transmission unit.

Further, for forwarding data packets within the source-selected path routing network 130 from the second node 137 to the first node 136, it is necessary to encapsulate the data packets received from the neighboring legacy IP network A 110 into one or more data packets suitable for forwarding in the source-selected path routing network 130. Said encapsulated data packets suitable for forwarding within the source-selected path routing network 130 need to contain information about the selected path along which the data packets should be forwarded, so that said encapsulated data packets can be transmitted to the first node 136 following exactly said selected path.

Once the data packets are received at the first node 136, said data packets are again decapsulated by the first node 136.

Finally, data packets are forwarded from the first node 136 to the destination node B1 125 in legacy IP network B 120, with which it has an active BGP session, by next-hop routing according to a next-hop routing protocol such as e.g. the IP.

The example described with reference to FIG. 1 explains how a receiver IP host in a legacy IP network may make sure that traffic such as one or more data packets originating from a sender in a different legacy IP network have to traverse a source-selected path routing network in order to reach their destination IP host. As mentioned before, compared to a standard packet-switched network, in which data packets are forwarded according to next-hop routing, a source-selected path switching network offers superior reliability, security, control, and transparency properties. Further, the path selection based on network properties described above allows an optimized performance when forwarding legacy IP traffic.

Moreover, it is emphasized that the described system and method of carrying legacy IP Internet traffic over a source-selected path routing network is performed in a fully transparent way, since neither the hosts nor the legacy IP networks are aware of the source-selected path routing network that is traversed when forwarding data packets from a source to a destination host.

Therefore, the described system and method enables legacy IP traffic to benefit from the qualities of a source-selected path routing network without the need of introducing any changes to applications, hosts or legacy IP networks. Further, the method(s) as described in this present application may also be stored on a non-transitory computer-readable medium, wherein a processor or processors can use the non-transitory computer-readable medium to carry out the method(s). The processor or processors can be located in a router or routers.

Merely router devices such as the first node 136 and the second node 137 that form part of the source-selected path routing network 130 need to apply the described steps in order to interface the source-selected path routing network 130 with neighboring legacy IP networks such as legacy IP network A 110 and legacy IP network B 120. Said router devices on the one hand enable the exchange of routing information in the form of IP prefix announcements and withdrawals between neighboring legacy IP networks through the source-selected path routing network. On the other hand, said router devices enable transporting data packets through a source-selected path routing network by encapsulating said data packets into suitable data packets for forwarding within the source-selected path routing network and by decapsulating said data packets again before said data packets leave the source-selected path routing network. Hence, said router devices are responsible for the interoperability between legacy IP networks and a source-selected path routing network.

While FIG. 1 describes the case that a receiver IP host such as node B1 125 in the legacy IP network B 120 announces its routing information exclusively to the first node 136 in the neighboring source-selected path routing network 130, a receiver IP host may also announce its routing information to further nodes in further neighboring legacy IP networks.

Figure 3:
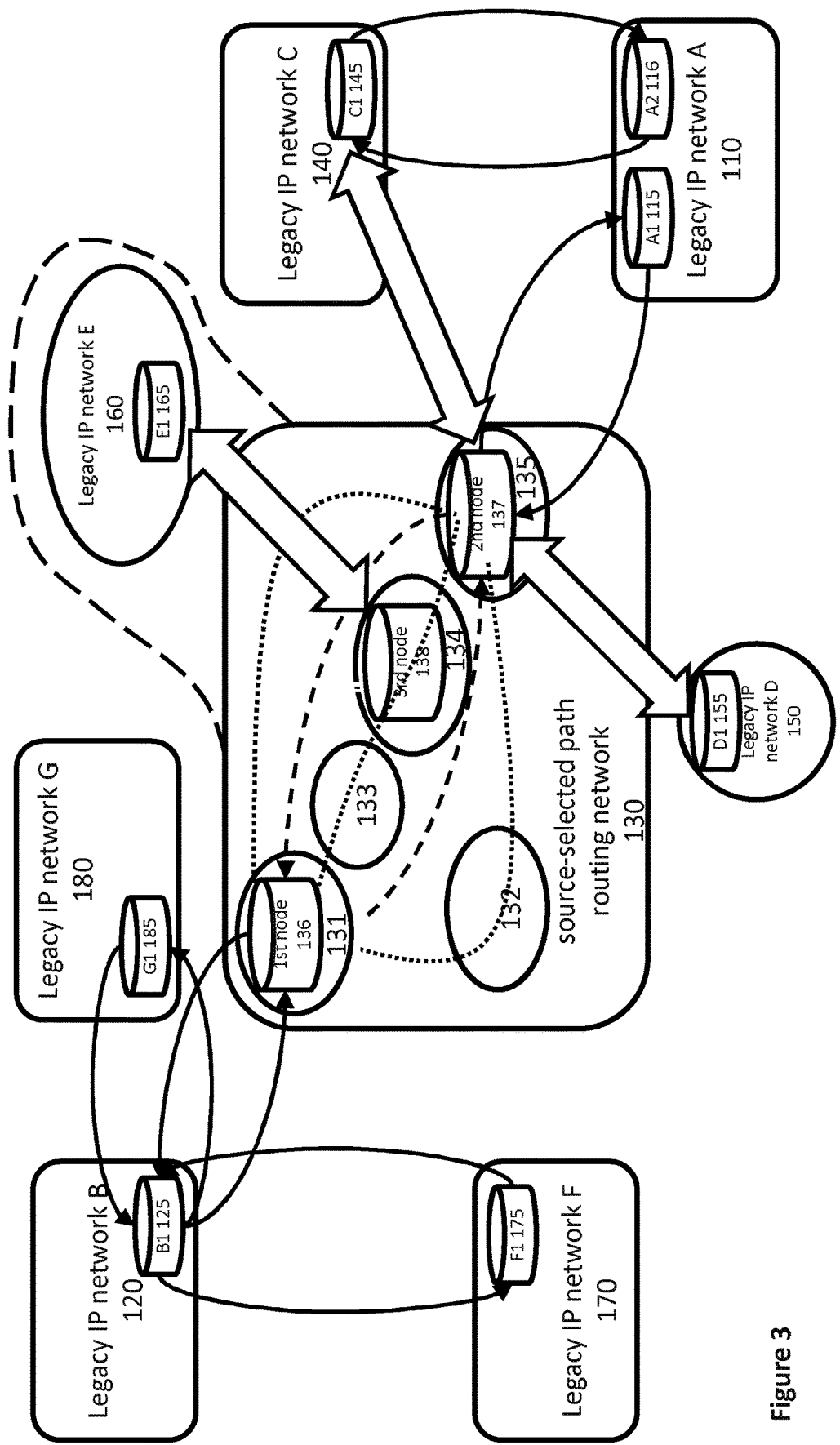
FIG. 3 schematically illustrates an embodiment with further networks that may interface with the plurality of different networks shown in FIG. 1.

Such case is illustrated in FIG. 3, in which node B1 125 in legacy IP network B 120 announces its routing information to node F1 175 in the neighboring legacy IP network F 170 and to node G1 185 in the further neighboring legacy IP network G 180.

When performing said announcement to both neighboring legacy IP networks F 170 and G 180, node B1 125 in legacy IP network B 120 may also split its routing information into two different IP prefixes. While one of said IP prefixes is then exclusively announced to the first node 136 in the source-selected path routing network 130, the other of said two IP prefixes is not only announced to the first node 136 in the source-selected path routing network 130, but also to node F1 175 in the legacy IP network F 170 and to node G1 185 in the legacy IP network G 180. Obviously, the announcement of the routing information to neighboring legacy IP networks is not limited to merely those specific legacy IP networks F 170 and G 180 shown in FIG. 2. Instead, node B1 125 in legacy IP network B 120 may additionally announce its routing information to a plurality of further neighboring legacy IP networks (not shown in FIG. 2).

By performing such an announcement of its routing information to further legacy IP networks such as legacy IP networks F 170 and G 180 in addition to source-selected path routing network 130, node B1 125 in legacy IP network B 120 can no longer make sure that data packets destined to node B1 125 are exclusively forwarded through the source-selected path routing network 130. However, by announcing its routing information additionally to further legacy IP networks, node B1 125 may increase its availability. Namely, data packets may reach node B1 125 even if the source-selected path routing network 130 fails. Hence, while the present application generally describes a method that allows forcing data packets over a source-selected path routing network, the present application also enables realizing more flexible policies.

Further, when announcing its routing information to both the first node 136 in the source-selected path routing network 130 and the nodes F1 175 and G1 185 in further legacy IP networks F 170 and G 180, node B1 125 in legacy IP network B 120 may also explicitly communicate a preference for the source-selected path routing network 130 over the two legacy IP networks F 170 and G 180. Node B1 125 may express such a preference for the source-selected path routing network 130 by de-prioritizing the paths towards the two legacy IP networks F 170 and G 180 by prolonging said paths by prepending routing information such as its own AS number several times.

While the above-described systems and methods enable a transparent way to attract and to transmit legacy Internet traffic through a source-selected path routing network, control over which traffic should be attracted and then transmitted through a source-selected path routing network acting as a single backbone AS in BGP is limited to direct BGP neighbors of said backbone AS. Additional steps are necessary if also BGP neighbors of said backbone AS should be reached that are more than one hop away from said backbone AS.

Networks that are more than one hop away from the source-selected path routing network acting as a single backbone AS in BGP need to rely on route announcement decisions made by BGP ASes that are closer to said single backbone AS.

An example for such a network that is more than one hop away from the source-selected path routing network acting as a single backbone AS in EGP is given by legacy IP network C 140 in FIG. 1. Data packets originating from legacy IP network B 120 and destined for a node in legacy IP network C 140 completely depend on the route announcement decisions made by neighboring legacy IP network A 110 of legacy IP network C 140. Said data packets merely pass through the source-selected path routing network 130, if legacy IP network A 110 has previously announced its routing information and said of legacy IP network C 140 to the second node 137 in the source-selected path routing network.

To remedy said dependency from networks that are direct neighbors of a source-selected path routing network acting as a single backbone AS in BGP, in the following, several mechanisms are described how an individual network that is not a direct neighbor of a source-selected path routing network can participate in said route announcement decisions and thus ensure that traffic destined to said individual network is transmitted through said source-selected path routing network.

A first option is available for a network that is a BGP AS, i.e. able to communicate using the BGP. This applies for example to legacy IP network C 140 in FIG. 2. As can be seen from FIG. 2, a network tunnel may be established from the node C1 145 in legacy IP network C 140 to the second node 137 in the source-selected path routing network 130. Through said tunnel, a BGP session may be established between node C1 145 in legacy IP network C 140 and the second node 137 in the source-selected path routing network, so that the legacy IP network C 140 logically becomes a direct neighbor of the source-selected path routing network 130 acting a backbone AS in BGP. For establishing said tunneling between legacy IP network C 140 and source-selected path routing network 130, the available techniques comprise amongst others BGP-over-GRE or BGP-over-IPSec.

For a second option, it is not necessary that a network is a BGP AS, i.e. able to communicate using the BGP. Legacy IP network D 150 in FIG. 3 may constitute such a non-BGP network that is not a direct neighbor of source-selected path routing network 130. As it is shown in FIG. 3, legacy IP network D 150 may also set up a network tunnel to the second node 137 in the source-selected path routing network 130 using well-known mechanisms and protocols such as L2TP, GRE, VXLAN etc. Subsequently, legacy IP network D 150 may exchange routing information with the source-selected path routing network 130 either through an out of band mechanism, for example as part of a service contract, or by using an interior gateway protocol (IGP) such as OSPF or IS-IS. In this way, legacy IP network D 150 conceptually becomes part of autonomous system 135. Hence, second node 137 in the source-selected path routing network 130, to which the network tunnel has been established, is enabled to announce the routing information such as the desired routing prefixes of the non-BGP legacy IP network D 150.

The third option is described with reference to non-BGP network E 160 in FIG. 3. Said network E 160 may become part of the source-selected path routing network 130 itself by establishing at least one source-selected path routing network link to an existing AS of the plurality of ASes 131, 132, 133, 134, 135 in the source-selected path routing network 130. In FIG. 3, said link is established to AS 134 comprising a third node 138. Hereby, said source-selected path routing network link may be either a direct link or be again a link via a network tunnel. Network E 160 thus becomes an AS equal to the plurality of ASes 131, 132, 133, 134, 135 of the source-selected path routing network 130.

The present technology an also include a system for routing and forwarding data packets. The system can comprise a first legacy IP network B comprising a node B1; a second legacy IP network A comprising a node A1; and a source-selected path routing network being a direct neighbor of both the first legacy IP network B and the second legacy IP network A, the source-selected path routing network comprising a plurality of autonomous systems, ASes, wherein at least two of said plurality of ASes comprise a routing device according to the methods disclosed in this application, and wherein the source-selected path routing network is configured to act as a single backbone AS when communicating with node B1 in the legacy IP network B and with node A1 in the legacy IP network A.

From the forgoing and further it will be appreciated that, although specific aspects have been described herein for purposes of illustration, various modifications may be made without deviating from the scope of the present disclosure. The scope of the present application is limited by the appended claims.

The invention claimed is:

1. A method for routing and forwarding data packets to a legacy IP network through a source-selected path routing network comprising a plurality of autonomous systems (ASes) wherein data packets are transmitted from a node A1 of the legacy IP network A to a node B1 of a legacy IP network B, wherein the method comprises the steps of:

announcing, by the node B1 of the legacy IP network B, routing information to a first node within the source-selected path routing network using an exterior gateway protocol, wherein said source-selected path routing network is a direct neighbor of the legacy IP network B;
announcing the routing information announced by node B1 to a second node within the source-selected path routing network using an internal source-selected path routing network protocol;
announcing, by the second node to a node A1 of the legacy IP network A being a direct neighbor of the source-selected path routing network, the routing information announced to the first node by node B1 without announcing routing information necessary for routing data packets within the source-selected path routing network between the first and second node, wherein the source-selected path routing network is to function as a single Border Gateway Protocol (BGP)-AS when communicating with the node A1 of the legacy IP network A, wherein the single BGP-AS includes a publicly registered BGP-AS number;
forwarding data packets from node A1 destined for node B1 to the second node using an appropriate next-hop routing protocol;
forwarding the data packets from the second node to the first node along a selected path via a plurality of ASes of the source-selected path routing network; and
forwarding the data packets from the first node to node B1 using a next-hop routing protocol.

2. The method of claim 1, further comprising the steps of:
announcing, by the node A1 of the legacy IP network A, routing information to the second node using an appropriate exterior gateway protocol;
announcing the routing information announced by node A1 to the first node using the internal source-selected path routing network protocol; and
announcing, by the first node, the routing information announced to the second node by node A1 to node B1 of the legacy IP network B without announcing routing information necessary for routing data packets within the source-selected path routing network between the second and first node.

3. The method of claim 2, further comprising the steps of:
announcing, by a node A2 of the legacy IP network A, the routing information announced to the node A1 to a node C1 in a further legacy IP network C using an appropriate exterior gateway protocol; and
forwarding data packets from node C1 destined for node B1 via the source-selected path routing network.

4. The method of claim 3, wherein the steps of forwarding data packets from node A1 destined for node B1 to the second node and of forwarding data packets from the first node to node B1 are performed by next-hop routing.

5. The method of claim 4, wherein the routing information announced by node B1 is an IP prefix of legacy IP network B and the routing information announced by node A1 is an IP prefix of legacy IP network A.

6. The method of claim 5, wherein an appropriate exterior gateway protocol is the Border Gateway Protocol version 4.

7. The method of claim 6, wherein the step of forwarding the data packets from the second node to the first node via the plurality of ASes of the source-selected path routing network comprises:
selecting, among a subset of the plurality of available paths at the second node, a path for forwarding the data packets based on network properties of the subset of available paths;
encapsulating the data packets into one or more data packets suitable for forwarding in the source-selected path routing network; and
transmitting the encapsulated data packets along the selected path to the first node; upon receipt at the first node, decapsulating the data packets.

8. The method of claim 7, wherein the network properties of at least a subset of the plurality of available paths comprise latency, bandwidth, throughput, jitter, packet loss and/or maximum transmission unit.

9. The method of claim 1, further comprising
additionally announcing by the node B1 routing information to further nodes in further neighboring legacy IP networks and de-prioritizing the paths announced by node B1 to the further nodes in the further legacy IP networks by prolonging said paths by prepending the routing information several times.

10. The method of claim 1, further comprising
establishing, by a border gateway protocol (BGF) legacy IP network C not being a direct neighbor of the source-selected path routing network, a network tunnel to a node in the source-selected path routing network, wherein the legacy IP network C logically becomes a direct neighbor of the source-selected path routing network.

11. The method of claim 1, further comprising establishing, by a non-BGP legacy IP network D that is not a direct neighbor of the source-selected path routing network, a network tunnel to a node in the source-selected path routing network, wherein the non-BGP legacy IP network D becomes conceptually part of the source-selected path routing network.

12. The method of claim 11, further comprising announcing, by the node in the source-selected path routing network to which the network tunnel has been established, the routing information of the non-BGP legacy IP network D.

13. The method of claim 1, further comprising establishing, by a non-BGP network E, at least one direct or tunneling link to a node in the source-selected path routing network, wherein the source-selected non-BGP network E becomes part of the source-selected path routing network by becoming itself one of the plurality of ASes of the source-selected path routing network.

14. A router device for use inside an autonomous system (AS) of a source-selected path routing network capable of interfacing the source-selected path routing network comprising a plurality of autonomous systems (ASes) with neighboring legacy IP networks, the router device configured to:
exchange routing information in the form of IP prefix announcements of legacy IP networks with a neighboring legacy IP network using an exterior gateway protocol, wherein no routing information necessary for routing data packets within the source-selected path routing network are exchanged;
exchange said routing information with a second router device located in a second AS of the source-selected path routing network using an internal source-selected path routing network protocol;
transport data packets received from the neighboring legacy IP network through the source-selected path routing network by encapsulating said data packets into suitable data packets for forwarding within the source-selected path routing network, wherein the source-selected path routing network is to function as a single Border Gateway Protocol (BGP)-AS when communicating with the node A1 of the legacy IP network A, wherein the single BGP-AS includes a publicly registered BGP-AS number; and forward data packets received from the second router device located in the second AS of the source-selected path routing network to the neighboring legacy IP network by decapsulating said data packets before said data packets leave the source-selected path routing network.

15. A non-transitory computer-readable medium storing instructions that when executed by a processor or processors cause a device or devices to perform operations, the operations comprising:

announcing, by a node B1 of a legacy IP network B, routing information to a first node within a source-selected path routing network using an exterior gateway protocol, wherein said source-selected path routing network is a direct neighbor of the legacy IP network B;

announcing the routing information announced by node B1 to a second node within the source-selected path routing network using an internal source-selected path routing network protocol;

announcing, by a second node to a node A1 of the legacy IP network A being a direct neighbor of the source-selected path routing network, the routing information announced to the first node by node B1 without announcing routing information necessary for routing data packets within the source-selected path routing network between the first and second node wherein the source-selected path routing network is to function as a single Border Gateway Protocol (BGP)-AS when communicating with the node A1 of the legacy IP network A, wherein the single BGP-AS includes a publicly registered BGP-AS number, wherein the source-selected path routing network includes a plurality of autonomous systems (ASes) that are to use source-selected path routing;

forwarding data packets from node A1 destined for node B1 to the second node using an appropriate next-hop routing protocol;

forwarding the data packets from the second node to the first node along a selected path via the plurality of ASes of the source-selected path routing network; and forwarding the data packets from the first node to node a1 using an appropriate next-hop routing protocol.

16. The non-transitory computer-readable medium of claim 15, the operations further comprising:

announcing, by the node A1 of the legacy IP network A, routing information to the second node using an appropriate exterior gateway protocol;

announcing the routing information announced by node A1 to the first node using the internal source-selected path routing network protocol; and announcing, by the first node, the routing information announced to the second node by node A1 to node B1 of the legacy IP network B without announcing routing information necessary for routing data packets within the source-selected path routing network between the second and first node.

17. The non-transitory computer-readable medium of claim 15, the operations further comprising:

announcing, by a node A2 of the legacy IP network A, the routing information announced to the node A1 to a node C1 in a further legacy IP network C using an appropriate exterior gateway protocol; and forwarding data packets from node C1 destined for node B1 via the source-selected path routing network.

18. The non-transitory computer-readable medium of claim 15, the operations further comprising: wherein the steps of forwarding data packets from node A1 destined for node B1 to the second node and of forwarding data packets from the first node to node B1 are performed by next-hop routing.

19. The non-transitory computer-readable medium of claim 15, the operations further comprising: wherein the routing information announced by node B1 is an IP prefix of legacy IP network B and the routing information announced by node A1 is an IP prefix of legacy IP network A.

20. The non-transitory computer-readable medium of claim 15, the operations further comprising, wherein the step of forwarding the data packets from the second node to the first node via the plurality of ASes of the source-selected path routing network comprises:

selecting, among a subset of the plurality of available paths at the second node, a path for forwarding the data packets based on network properties of the subset of available paths;

encapsulating the data packets into one or more data packets suitable for forwarding in the source-selected path routing network;

transmitting the encapsulated data packets along the selected path to the first node; and upon receipt at the first node, decapsulating the data packets.

* * * * *